H. HESS.
GAGE.
APPLICATION FILED OCT. 18, 1912.
1,159,025.
Patented Nov. 2, 1915.
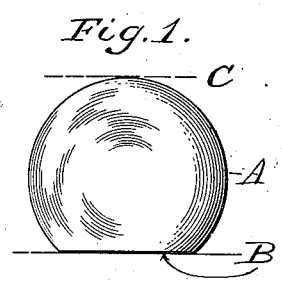
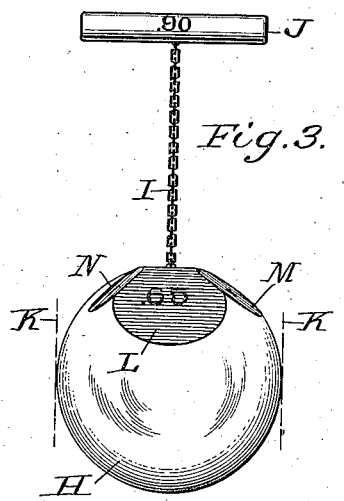
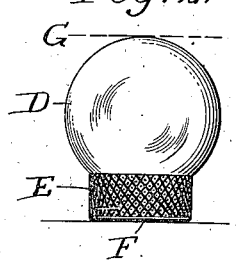
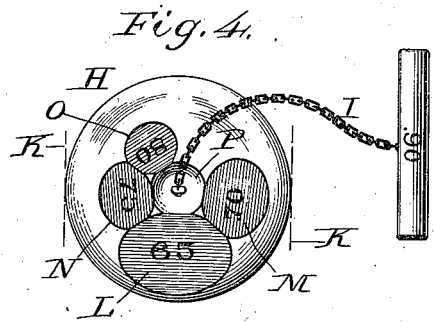
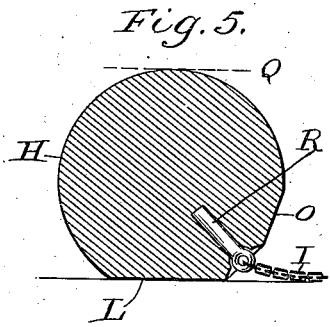
Witnesses:
E. B. King
L. C. Amicon
Inventor
Henry Hess
By his Attorneys, Rogers,
Kennedy & Campbell.

UNITED STATES PATENT OFFICE.

HENRY HESS, OF PHILADELPHIA, PENNSYLVANIA.

GAGE.

1,159,025.  Specification of Letters Patent.  Patented Nov. 2, 1915.

Application filed October 18, 1912. Serial No. 726,413.

*To all whom it may concern:*

Be it known that I, HENRY HESS, a citizen of the United States, residing at Philadelphia, in the county of Philadelphia and State of Pennsylvania, have invented certain new and useful Improvements in Gages, of which the following is a specification, reference being had therein to the accompanying drawing.

My invention relates to gages, and more particularly to that class of gage which may be designated a fixed dimension gage, for example for gaging height, diameters of bores and the like. By a fixed dimension gage I mean one wherein there is no adjustment, the gage on the contrary being permanently designed or set for a fixed size or dimension to which the object being gaged must accord in the use of the instrument.

It is an object of the present invention to afford gages of the types hereinafter referred to, wherein are comprised preformed spherical hardened steel balls, and such gages may be provided in complete sets of sizes varying from each other by convenient gradations. I have already in prior applications pointed out the great advantages pertaining to the use of preformed spheres for affording contacts of gages. For example, the sphere maintains correctness of shape in a higher degree and is less liable to distortion than other shapes. A steel sphere may be superlatively hardened as well as made of most accurate shape. It is less subject to superficial damage and to change of shape due to violent treatment. The preformed spheres may be made at less expense than the other hardened steel shapes, so that an entire system of gages might be constructed at less cost than a single micrometer gage adapted to the same objects.

Another object and advantage hereof is to afford, as the present invention does afford, a gage adapted not only to be used as a standard of reference for standardizing other gages, but also for direct use by a workman in the shop. Possibility of error is avoided when the proper gage has been selected for a given work, since no change of adjustment is possible, and there is little wear from moving parts.

I will now describe several instances or embodiments of the present invention, and will then point out the novel features in the claims.

In the accompanying drawings, Figure 1 shows in side elevation a height gage embodying part of the present invention. Fig. 2 in similar view shows a modified form of the height gage of Fig. 1. Fig. 3 shows a bore gage embodying part of the present invention, this gage being also adapted to measure heights as with the gage of Figs. 1 and 2. Fig. 4 is a top view of the combined bore and height gage shown in Fig. 3. Fig. 5 is a central cross-section of the combined bore and height gage in proper position for gaging heights.

Similar letters of reference designate corresponding parts in the several figures of the drawings.

The height gage A, Fig. 1, consists of a preformed sphere constituted preferably of hardened steel, whereon a flattened side has been produced at B by grinding, machining or otherwise. By standing the gage upon its flat side B, it serves as a height gage for determining the height or dimension between the plane of the flat side B and the plane or surface C, against which touches the opposite contact point of the sphere. Whatever may be the distance or dimension between the planes B and C will be the dimension of the height gage, and this dimension will be etched or otherwise marked upon the flat side B. This etching is not shown in Fig. 1 but is indicated in Figs. 3 and 4.

In the modification of Fig. 2 is shown, as in Fig. 1, a flat sided spherical height gage. The sphere D in this case is not necessarily flattened, but has permanently attached or soldered to it a cylindrical or other shaped base E whose under side F forms one of the contact surfaces. The dimension of this height gage will be the distance between the plane of the flat side F and the plane G parallel thereto, tangent to the opposite contact point of the sphere.

The modification shown in Figs. 3, 4 and 5 is adapted to measuring bores. This gage consists of a preformed hardened steel sphere H having a manipulating means not rigidly secured to the sphere but preferably of flexible nature such as chain I, to which handle piece J may be attached. The dimension of this gage may be .90 inch and marked upon the handle J. Assuming a bore is to be gaged having a diameter or dimension bounded by the vertical planes or surfaces K, K, the gage will be dropped by gravity or pushed into the bore, and when the gaging is completed will be removed by means of the chain and handle. As a bore gage this instrument, so described, possesses the great advantage that the steel sphere will find inaccuracies in a cylindrical bore or surface to be explored which an ordinary gage is unable to detect, this being because the sphere can follow the changes in the shape of the surfaces since they measure successive dimensions, whereas an ordinary gage is able only to measure minimum or maximum dimensions owing to its substantial length and surface of contact. The chain I serves not only as an efficient means of removing the gage from the bore, but is compact, thus saving space and weight, and is also capable of being deflected to one side so as not to interfere with the operation of gaging heights as now to be described.

The gage shown in Figs. 3, 4 and 5 is also adapted to be employed as a height gage analogously to the gage of Figs. 1 and 2. Moreover instead of a single flattened side or surface, I am able by this invention to provide a gage with a plurality of flattened sides which do not conflict but coöperate to render the gage adaptable to several distinct dimensions. The several flattened areas are, however, confined well within a hemisphere or half of the surface, so that when the gage is used as a bore gage as in Fig. 1, the horizontal equator will be uninterrupted.

A flattened surface L may be of such size as to afford a dimension of .65 inch when employed in the manner indicated in Figs. 1 or 5 for measuring heights. This flattened surface will be practically circular and may have the dimension marked upon it as indicated. A similar flattened surface at M may afford a dimension of .70 inch for a height gage. A third flattened surface N may afford a dimension of .75 inch, and a fourth flattened surface O may afford a dimension of .80 inch. The use of this instrument as a height gage is indicated in Fig. 5, where the surface L is employed as a base and the opposite contact point of the sphere tangentially touches the plane Q, the distance between L and Q being .65, the dimension of the gage. Between the several flattened surfaces L, M, N, O, or otherwise suitably located, may be an attaching point P for the flexible attachment or chain I; for example the portion P may be concave and the chain may be secured to the sphere therein by means of a pin R indicated in Fig. 5.

The gages thus described will be seen to possess the advantages and attain the objects hereinabove recited, and other advantages will be apparent to those skilled in the art.

Since certain features or details referred to may be employed in various forms and with or without other features or details, I do not wish to be limited to the specific constructions except as set forth in the appended claims.

What I claim and desire to secure by Letters Patent is:

1. A fixed-dimension gage for effecting scientifically accurate measurements, the same comprising a preformed sphere having a plurality of different sized flat surfaces produced thereon, each opposed by a portion of the gage's spherical surface; whereby are afforded a plurality of gage dimensions for measuring heights.

2. A combined height and bore gage comprising a sphere having a flexible attachment for entering it into and removing it from a bore, and a plurality of different sized flattened surfaces adjacent said flexible attachment for affording a plurality of dimensions for gaging heights.

3. A combined height and bore gage comprising a sphere having a flexible attachment for entering it into and removing it from a bore, and said sphere having a flattened surface serving as a base for gaging heights by coöperation with the opposite spherical contact point, said flattened side formed to leave the sphere's equator uninterrupted for gaging bores, and said flexible attachment being connected to the sphere at the same side of the uninterrupted gaging equator as said flattened base.

4. A combined height and bore gage comprising a sphere having a manipulating attachment for entering it into and removing it from a bore, and said sphere having a flattened surface serving as a base for gaging heights by coöperation with the opposite spherical contact point, said flattened side formed to leave the sphere's equator uninterrupted for gaging bores, and said attachment being connected to the sphere permanently in such manner as not to interfere either with the height gaging or bore gaging operations of the instrument.

In testimony whereof I affix my signature in presence of two witnesses.

HENRY HESS.

Witnesses:
CHARLES S. BUTLER,
OLGA A. HOLLAND.